United States Patent
Song et al.

(10) Patent No.: US 11,634,177 B2
(45) Date of Patent: Apr. 25, 2023

(54) SUB-FRAME MOUNTING COMBINATION STRUCTURE OF VEHICLE BODY

(71) Applicants: Hyundai Motor Company, Seoul (KR); Kia Corporation, Seoul (KR)

(72) Inventors: HanSeok Song, Hwaseong-si (KR); Songjae Jeong, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 49 days.

(21) Appl. No.: 17/513,472

(22) Filed: Oct. 28, 2021

(65) Prior Publication Data

US 2022/0250682 A1    Aug. 11, 2022

(30) Foreign Application Priority Data

Feb. 10, 2021    (KR) .................. 10-2021-0019478

(51) Int. Cl.
| | | |
|---|---|---|
| *B62D 25/08* | (2006.01) | |
| *B62D 21/15* | (2006.01) | |
| *B62D 21/02* | (2006.01) | |
| *B62D 27/02* | (2006.01) | |

(52) U.S. Cl.
CPC .......... *B62D 21/02* (2013.01); *B62D 21/155* (2013.01); *B62D 25/08* (2013.01); *B62D 27/023* (2013.01)

(58) Field of Classification Search
CPC ...... B62D 21/00; B62D 21/02; B62D 21/152; B62D 21/155; B62D 27/023
USPC ............................... 296/204, 193.07, 29, 30
See application file for complete search history.

(56) References Cited

U.S. PATENT DOCUMENTS 11,097,787 B2 *    8/2021    Ebisumoto ............. B62D 25/20

FOREIGN PATENT DOCUMENTS

EP                2371680 A1 *    10/2011    ............. B62D 25/14

* cited by examiner

*Primary Examiner* — Dennis H Pedder
(74) *Attorney, Agent, or Firm* — Morgan, Lewis & Bockius LLP

(57) ABSTRACT

A sub-frame mounting combination structure of a vehicle body may include a fender apron side member mounted at the rear end portion of a front side member in the longitudinal direction of the vehicle body, a first side extension disposed in the transverse direction of the vehicle body and connected to the inside of the fender apron side member, a second side extension disposed in the transverse direction and connected to the outside of the fender apron side member, a tunnel member disposed in the transverse direction connecting the first side extensions at both sides at the center portion of the vehicle body to each other, and having the same phase as the first side extension, and a cap type bracket disposed to cover the fender apron side member at a portion where the fender apron side member and the first and second side extensions are connected.

13 Claims, 11 Drawing Sheets

SUB-FRAME MOUNTING COMBINATION STRUCTURE OF VEHICLE BODY

CROSS-REFERENCE TO RELATED APPLICATION

The present application claims priority to Korean Patent Application No. 10-2021-0019478 filed on Feb. 10, 2021, the entire contents of which is incorporated herein for all purposes by this reference.

BACKGROUND OF THE INVENTION

Field of the Invention

The present invention relates to a sub-frame mounting combination structure of a vehicle body. More particularly, the present invention relates to a sub-frame mounting combination structure of a vehicle body, which can implement a flat floor structure by applying a 'cap' type sub-frame mounting structure.

Description of Related Art

In general, as for the vehicle body of a sedan or an RV (Recreational Vehicle), a cross member exists in the internal space and a center tunnel is made high. However, small commercial MPV (Multi-Purpose Vehicle) models include a wagon and a van and the ability of carrying people and loading freight is important for the characteristics of the vehicle type, so it is required to make the floor of the vehicle body flat.

To implement such a flat floor, the profiles of the rear end portion of the front side member (front sub-frame) and the center floor of a vehicle body are lifted, and accordingly, the vehicle body mounting-corresponding height of the rear mounting portion of the front sub-frame is increased.

When the height of the rear mounting portion of the front sub-frame is increased, the mounting portion is weak go X-axial and Y-axial loads and the Z-axial chassis input load is increased, so that the strength and durability of the vehicle body are decreased. Furthermore, the rear mounting portion of the front sub-frame exists only in a cross-section of the front side member, so there is a problem that the phases of the surrounding portion and the cross member do not coincide.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a sub-frame mounting combination structure of a vehicle body having advantages of being able to implementing a flat floor structure and improving the strength and durability of a vehicle body by applying a 'cap' type sub-frame mounting structure to the rear mounting portion of a front sub-frame (front side member).

A sub-frame mounting combination structure of a vehicle body according to various exemplary embodiments of the present invention is a transverse vehicle body structure mounted on front side members disposed at a first side and a second side of a front of the vehicle body in a longitudinal direction of the vehicle body, and includes: a fender apron side member mounted at the rear end portion of a front side member in the longitudinal direction of the vehicle body; a first side extension disposed in a transverse direction of the vehicle body and connected to an inside of the fender apron side member; a second side extension disposed in the transverse direction of the vehicle body and connected to an outside of the fender apron side member; a tunnel member disposed in the transverse direction of the vehicle body, connecting the first side extensions at first and second sides thereof at a center portion of the vehicle body to each other, and having a same phase as the first side extension; and a cap type bracket disposed to cover the fender apron side member at a portion where the fender apron side member and the first and second side extensions are connected.

The sub-frame mounting combination structure of a vehicle body according to various exemplary embodiments of the present invention may further include a dash lower side member disposed at and overlapping an overlapping portion formed by the first and second side extensions and the tunnel member.

A rear flange of the dash lower side member, the first and second side extensions, and a front flange of the tunnel member may be welded to overlap one another.

The dash lower side member may be disposed on a floor panel of the vehicle body.

The first and second side extensions and the tunnel member may be disposed under the floor panel of the vehicle body.

The cap type bracket may be welded to overlap a flange of the second side extension on an external surface of the fender apron side member.

The cap type bracket may be welded to overlap a flange of the first side extension on an internal surface of the fender apron side member.

A cap reinforcement member may be welded to the internal surface of the cap type bracket.

The sub-frame mounting combination structure of a vehicle body according to various exemplary embodiments of the present invention may further include a side rear reinforcement member forming a cross-section by being connected to the second side extension and the fender apron side member.

According to various exemplary embodiments of the present invention, a flat floor structure is implemented by applying a 'cap type' sub-frame mounting structure, being able to prevent deterioration of durability due to an increase of the height of the front sub-frame rear end mounting portion and a chassis input load, and being able to increase the strength of the vehicle body may be improved.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
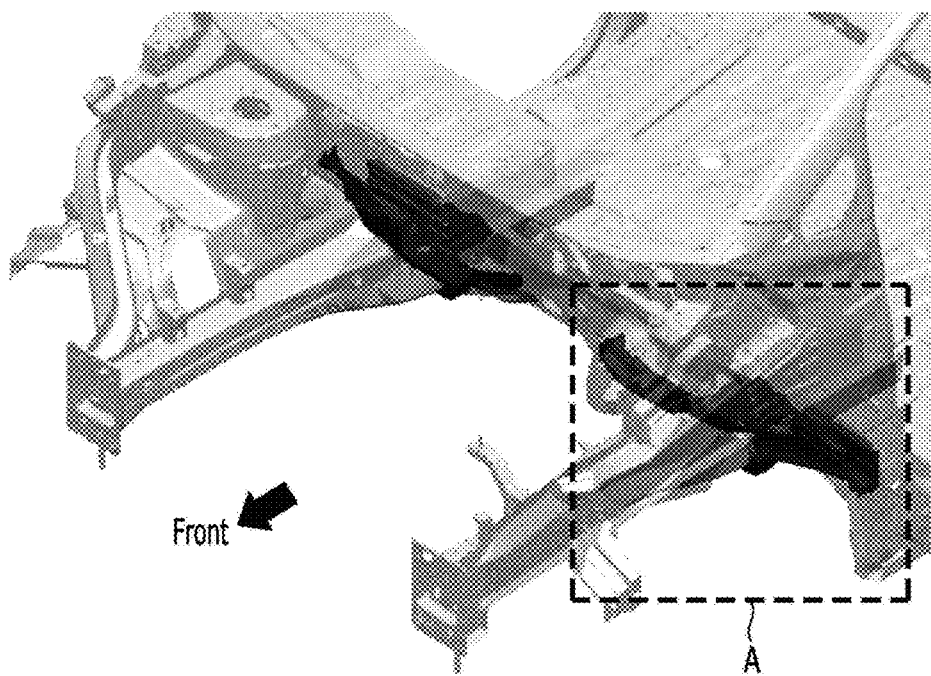
FIG. 1 is a perspective schematic view showing the case when a sub-frame mounting combination structure of a vehicle body according to various exemplary embodiments of the present invention is applied to a front side member.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereafter, various Exemplary embodiments of the present application will be described more fully with reference to the accompanying drawings, in which exemplary embodiments of the present invention are shown. The present invention may be implemented in various ways and is not limited to the exemplary embodiments described herein.

Furthermore, in several exemplary embodiments of the present invention, components having the same configuration are representatively described in an exemplary embodiment using the same reference numerals, and only the configuration different from the exemplary embodiment of the present invention is described in the other exemplary embodiments.

It may be noted that the drawings are schematic and are not constructed to fit the scales. The relative dimensions and ratios of the portions in the drawings are exaggerated or reduced in size for clarity and convenience in the drawings, and certain dimensions are only exemplified and are not limitative. Furthermore, the same reference numerals are used for the same structures, components, or portions shown in the two or more drawings to show similar characteristics. When an element is referred to as being "over" or "on" another element, it may be directly on the other element or intervening elements may be present therebetween.

Exemplary embodiments of the present invention show in detail one exemplary embodiment of the present invention. As a result, numerous variations of the drawings are expected. Therefore, various exemplary embodiments are not limited to specific shapes in regions shown in the figures, and for example, include also changes in shape by manufacturing.

Hereafter, a sub-frame mounting combination structure of a vehicle body according to various exemplary embodiments of the present invention is described in detail with reference to the accompanying drawings.

Figure 2:
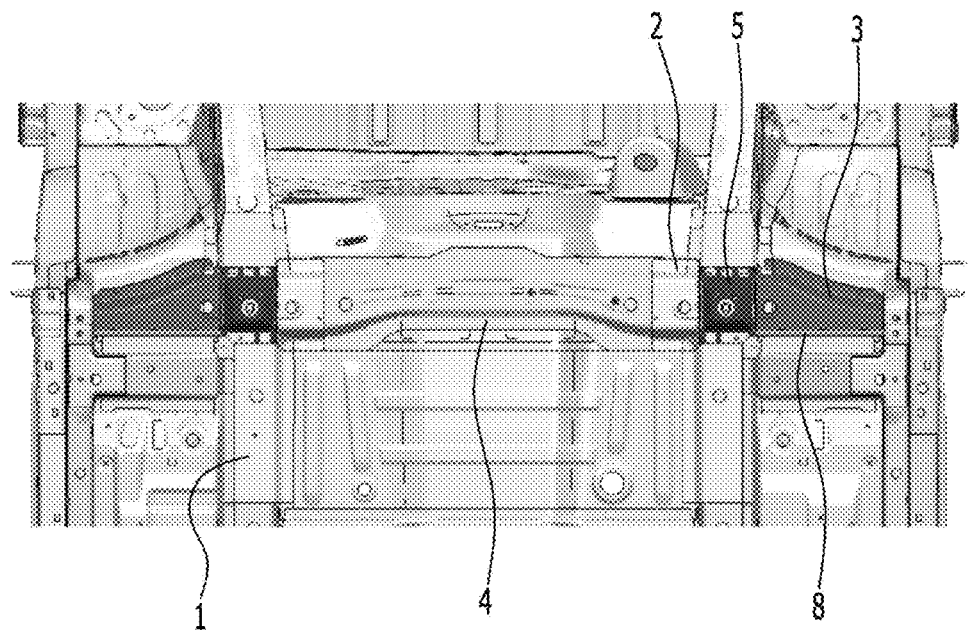
FIG. 2 is a plan view showing the sub-frame mounting combination structure of a vehicle body according to various exemplary embodiments of the present invention from under the vehicle body.
Figure 3:
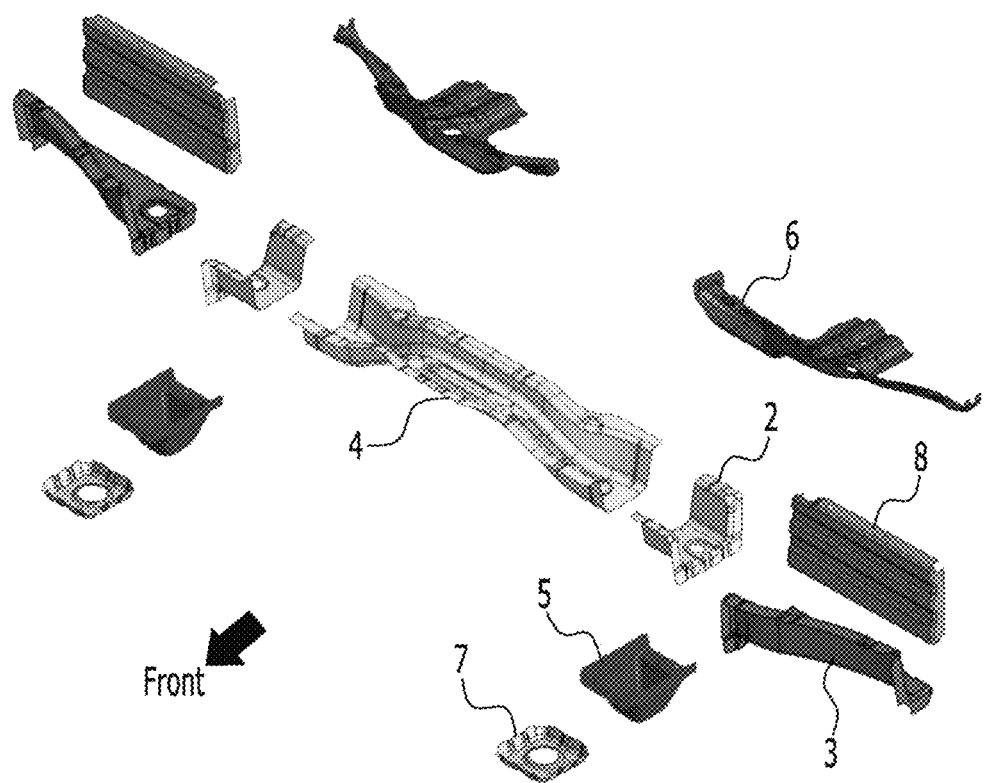
FIG. 3 is an exploded perspective schematic view showing the sub-frame mounting combination structure of a vehicle body according to various exemplary embodiments of the present invention is applied to a front side member.

FIG. 1 is a perspective schematic view showing the case when a sub-frame mounting combination structure of a vehicle body according to various exemplary embodiments of the present invention is applied to a front side member, FIG. 2 is a plan view showing the sub-frame mounting combination structure of a vehicle body according to various exemplary embodiments of the present invention from under the vehicle body, and FIG. 3 is an exploded perspective schematic view showing the sub-frame mounting combination structure of a vehicle body according to various exemplary embodiments of the present invention is applied to a front side member.

First, referring to FIG. 1, a sub-frame mounting combination structure (the portion indicated by 'A') of a vehicle body according to various exemplary embodiments of the present invention is applied to front (FR) sub-frames (front side members) disposed in parallel at both sides of the front of a vehicle body in the longitudinal direction of the vehicle body, respectively.

As shown in FIG. 2, the sub-frame mounting combination structure of a vehicle body according to various exemplary embodiments of the present invention includes a fender apron side member 1, a first side extension 2, a second side extension 3, a tunnel member 4, a cap type bracket 5, and a side rear reinforcement member 8.

The fender apron side member 1 is mounted at each of the rear end portions of front side members at both sides shown in FIG. 1 in the longitudinal direction of the vehicle body.

The first side extension 2 and the second side extension 3 are connected to the fender apron side member 1 in the transverse direction of the vehicle body. The first side extension 2 is connected to the fender apron side member 1 in a shape extending toward the interior of the vehicle body and the second side extension 3 is connected to the fender apron side member 1 in a shape extending outwardly from the vehicle body.

The tunnel member 4 is disposed at the center portion of the vehicle body in the transverse direction of the vehicle body and both end portions of the tunnel member 4 are connected to the first side extensions 2 at both sides. The tunnel member 4 may be connected to the first side extensions 2 to have the same phase (height).

The cap type bracket 5 is mounted to cover the fender apron side member 1 at the portion where the first side extension 2 and the second side extension 3 are connected to the fender apron side member 1. The cap type bracket 5 may be welded to the fender apron side member 1, and the first side extension 2 and the second side extension 3 may be welded to the external surface of the cap type bracket 5.

Since the cap type bracket 5 is mounted to cover the fender apron side member 1, the connection between the fender apron side member 1 and the first side extension 2 and the connection between the fender apron side member 1 and the second side extension 3 may be reinforced, and the step generated when the fender apron side member 1 and the front sub-frame mounting portion are connected may be compensated.

FIG. 3 is an exploded perspective schematic view showing the sub-frame mounting combination structure of a vehicle body according to various exemplary embodiments of the present invention is applied to a front side member.

As shown in FIG. 3, the first side member 2 and the second side member 3 may be connected at both sides with the tunnel member 4 therebetween. Though not shown in FIG. 3, the fender apron side member may be combined with the longitudinal direction of the vehicle body and the cap type bracket may be combined with the fender apron side member to cover the fender apron side member.

In FIG. 3, the first side extension 2 may be connected to overlap the bottom portion of the tunnel member 4. Furthermore, the cap type bracket 5 may be mounted to cover the fender apron side member 1 with the first side extension 2 therebetween. Furthermore, the second side extension 3 may be connected to the external surface of the cap type bracket 5. Furthermore, the second side extension 3 and the fender apron side member may be connected by the side rear reinforcement member 8.

Furthermore, a dash lower side member 6 may be further mounted at the portion where the first and second side extensions 2 and 3 and the tunnel member 4 are connected. The dash lower side member 6 may be disposed inside a vehicle to share an 'H'-surface flange formed by the first and second side extensions 2 and 3 and the tunnel member 4. That is, the dash lower side member 6 may be disposed on the floor panel of the vehicle body, and the first and second side extensions 2 and 3 and the tunnel member 4 may be disposed under the floor panel of the vehicle body. The rear flange of the dash lower side member 6 and the front flanges of the first and second side extensions 2 and 3 and the tunnel member 4 may be welded to overlap each other.

Figure 4:
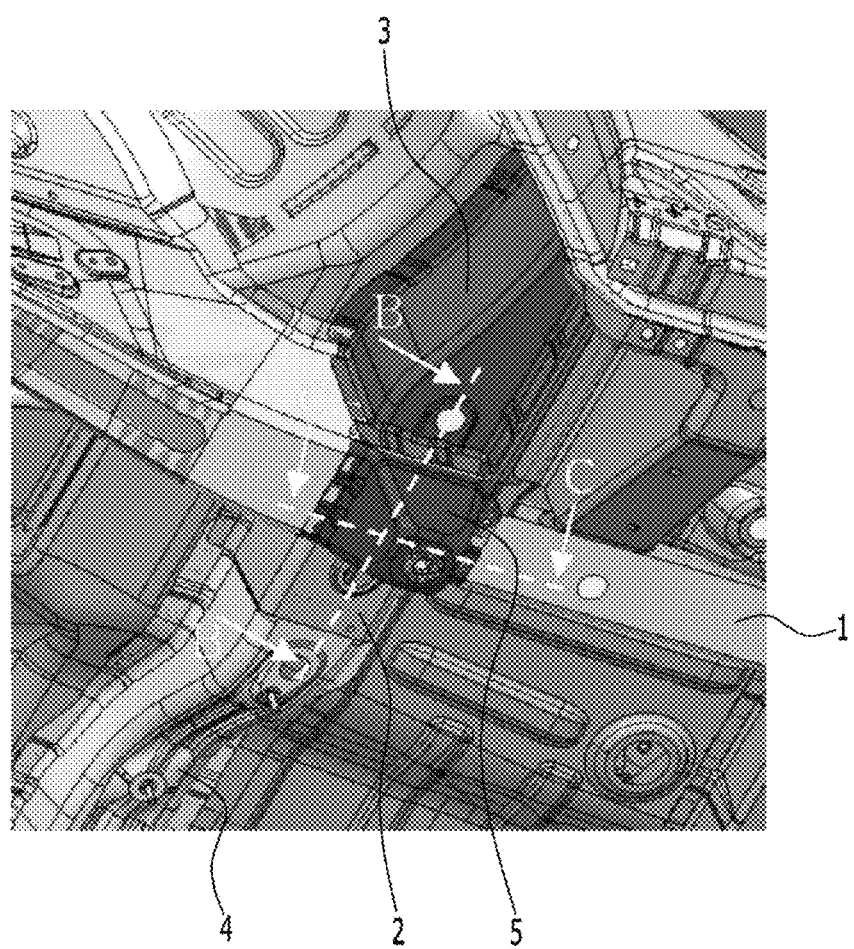
FIG. 4 is a perspective view showing the sub-frame mounting combination structure of a vehicle body according to various exemplary embodiments of the present invention from under the vehicle body.
Figure 5:
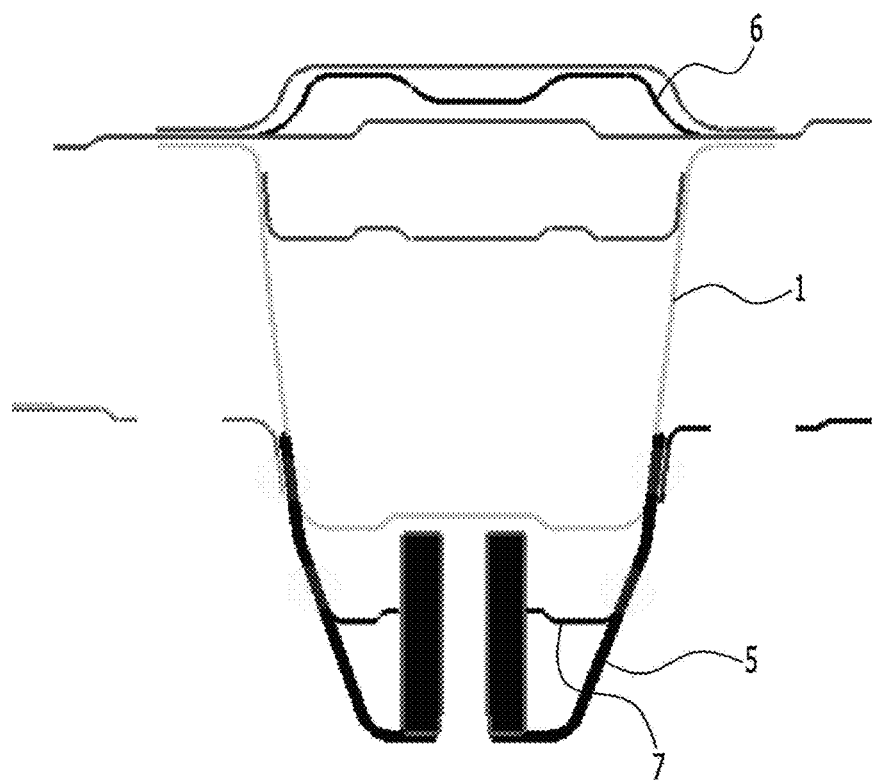
FIG. 5 is a cross-sectional view taken along line 'B-B' of FIG. 4.
Figure 6:
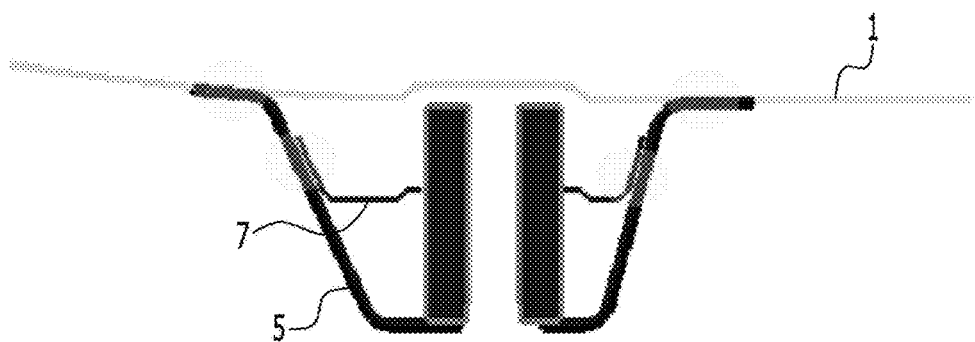
FIG. 6 is a cross-sectional view taken along line 'C-C' of FIG. 4.

FIG. 4 is a perspective view showing the sub-frame mounting combination structure of a vehicle body according to various exemplary embodiments of the present invention from under the vehicle body, FIG. 5 is a cross-sectional view taken along line 'B-B' of FIG. 4, and FIG. 6 is a cross-sectional view taken along line 'C-C' of FIG. 4.

Referring to FIG. 4, FIG. 5 and FIG. 6, the first side extension 2 is connected in a shape extending toward the interior of the vehicle body to overlap the tunnel member 4 disposed in the transverse direction of the vehicle body. Furthermore, the second side extension 3 is connected in a shape extending outwardly from the vehicle body to overlap the tunnel member 4. In the present configuration, the first and second side extensions 2 and 3 may be connected to have the same phase as the tunnel member 4. Furthermore, an end portion of the side rear reinforcement member 8 may be connected in a vertical shape to the side of the fender apron side member 1, and another end portion of the side rear reinforcement member 8 may be coupled to the second side extension 3. Furthermore, the cap type bracket 5 may be welded on the internal surface of the fender apron side member 1 to overlap the flange of the first side extension 2.

As shown in FIG. 5, the fender apron side member 1 has a 'U' shape and the lower edge portion of the 'U' shape forms an 'L' surface. The cap type bracket 5 may be welded to overlap 'L' surfaces at both sides of the fender apron side member 1. Furthermore, the first side extension 2 and the second side extension 3 may be welded to the external side of the cap type bracket 5 at the portions of the 'L' surfaces at both sides of the fender apron side member 1, respectively. That is, the cap type bracket 5 may be welded on the external surface of the fender apron side member 1 to overlap the flange of the second side extension 3. Furthermore, a cap type reinforcement member 7 may be welded across both internal surfaces of the cap type bracket 5 on the internal surfaces of the cap type bracket 5 in the transverse direction of the vehicle body.

Meanwhile, the upper portion of the fender apron side member 1 is bent outward in the transverse direction of the vehicle body, and the dash lower side member 6 may be coupled to overlap the present portion.

Meanwhile, as shown in FIG. 6, the fender apron side member 1 may be formed to form an 'H' surface in the front and rear direction of the vehicle body and the cap type bracket 5 may be welded to overlap the 'H' surface of the fender apron side member 1.

Figure 7:
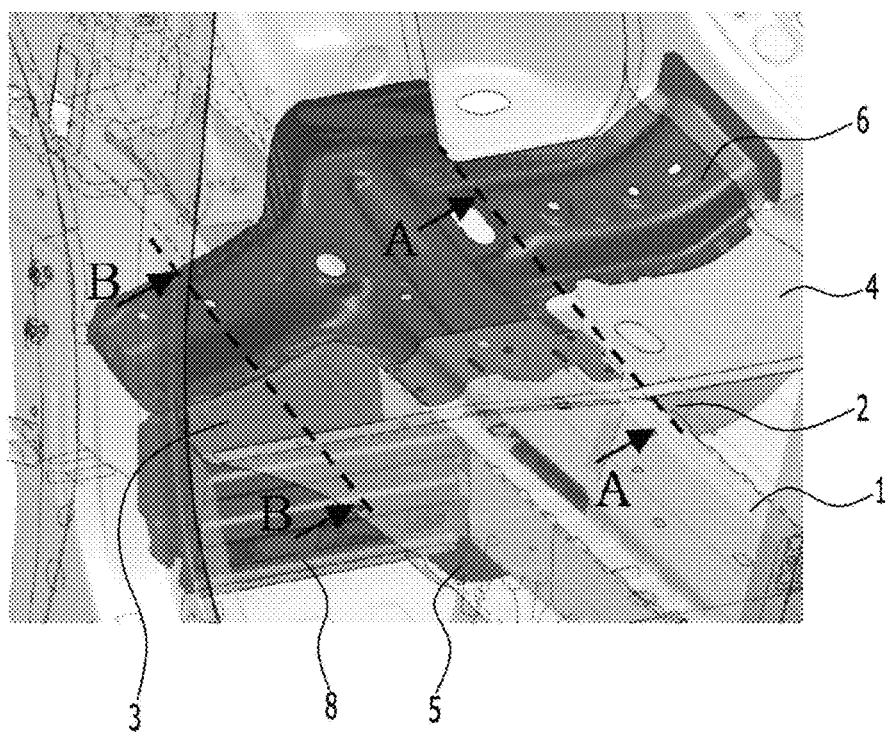
FIG. 7 is a perspective view showing the sub-frame mounting combination structure of a vehicle body according to various exemplary embodiments of the present invention from above the vehicle body.
Figure 8:
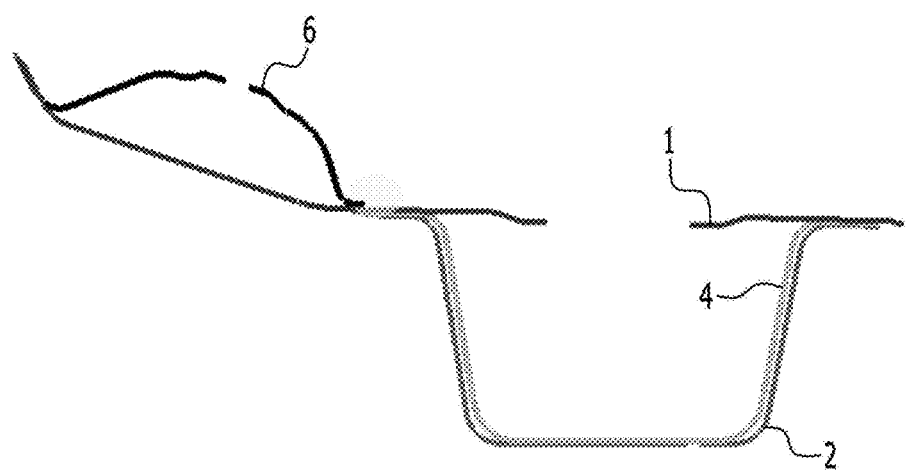
FIG. 8 is a cross-sectional view taken along line 'A-A' of FIG. 7.
Figure 9:
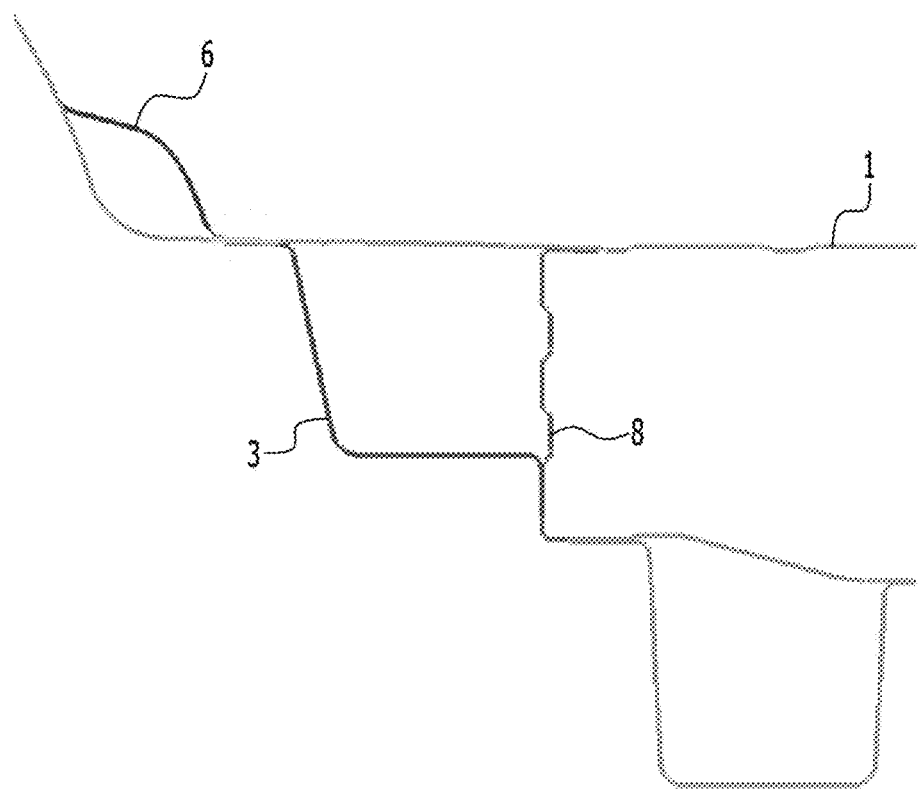
FIG. 9 is a cross-sectional view taken along line 'B-B' of FIG. 7.

FIG. 7 is a perspective view showing the sub-frame mounting combination structure of a vehicle body according to various exemplary embodiments of the present invention from above the vehicle body, FIG. 8 is a cross-sectional view taken along line 'A-A' of FIG. 7, and FIG. 9 is a cross-sectional view taken along line 'B-B' of FIG. 7.

As shown in FIG. 7, the dash lower side member 6 may be coupled to overlap the top portion of the fender apron side member 1 at a position facing the cap type bracket 5. Meanwhile, an end portion of the side rear reinforcement member 8 may be connected in a vertical shape to the side of the fender apron side member 1, and another end portion of the side rear reinforcement member 8 may be coupled to the second side extension 3. Accordingly, the side rear reinforcement member 8 can reinforce the connection of the fender apron side member 1 and the second side extension 3.

As shown in FIG. 8, at the interior of the vehicle body, the tunnel member 4 may be connected to overlap the bottom portion of the fender apron side member 1, and the first side extension 2 may be connected to overlap the bottom portion of the tunnel member 4. Furthermore, in the interior of the vehicle body, the dash lower side member 6 may be welded to the top portion of the fender apron side member 1.

Furthermore, as shown in FIG. 9, at the outside of the vehicle body, an end portion of the side rear reinforcement member 8 may be coupled vertically downward to the bottom portion of the fender apron side member 1, and another end portion of the side rear reinforcement member 8 may be welded to the second side extension 3. Furthermore, the second side extension 3 may be welded to the bottom portion of the fender apron side member 1. That is, the side rear reinforcement member 8 may configure a cross-section connecting the fender apron side member 1 and the second side extension 3 to each other. Furthermore, the dash lower side member 6 may be welded to the top portion of the fender apron side member 1 at the portion where the fender apron side member 1 and the second side extension 3 are welded.

Figure 10:
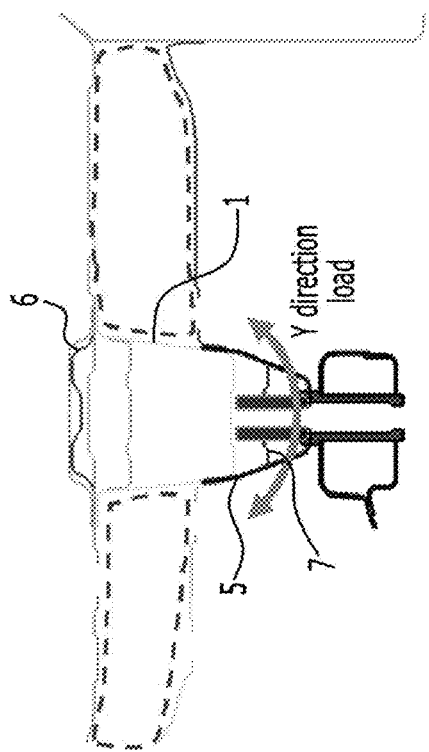
FIG. 10 is a view showing the case when an X-axial load and a Y-axial load are applied to the sub-frame mounting combination structure of a vehicle body according to various exemplary embodiments of the present invention.
Figure 10:
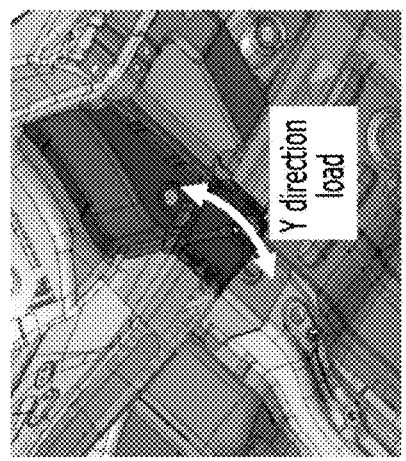
Figure 10:
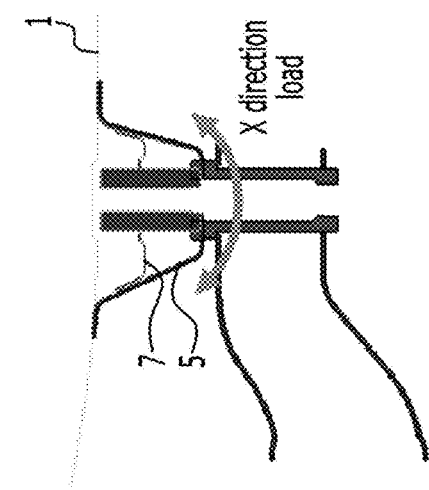
Figure 10:
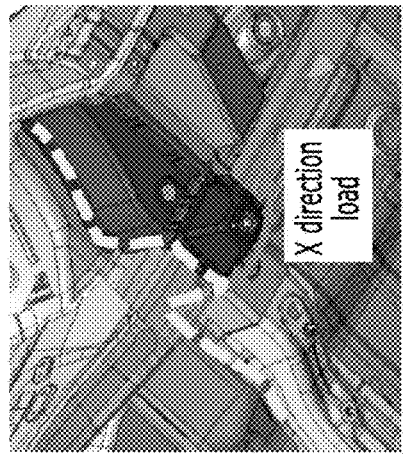
Figure 11:
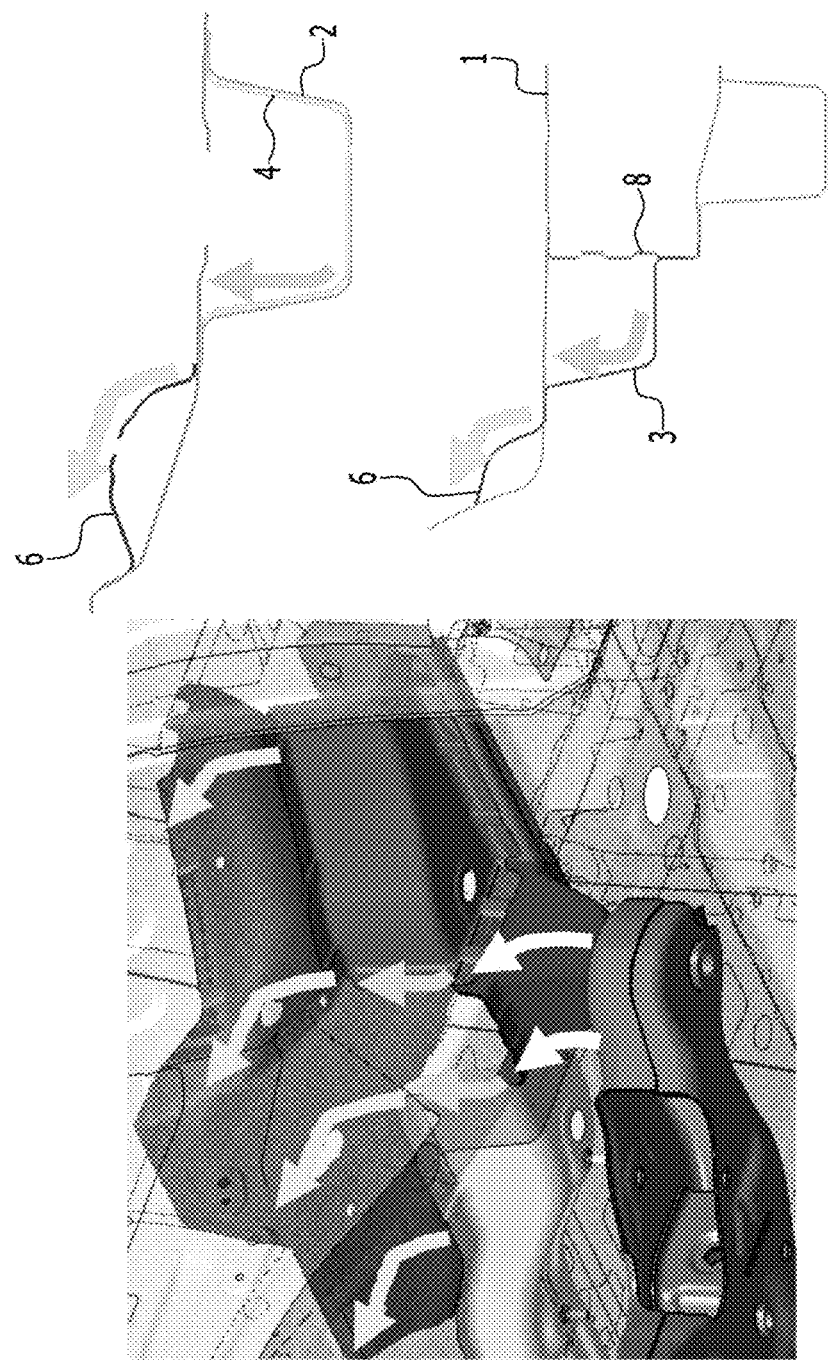
FIG. 11 is a view showing a load transmission route in the sub-frame mounting combination structure of a vehicle body according to various exemplary embodiments of the present invention.

FIG. 10 is a view showing the case when an X-axial load and a Y-axial load are applied to the sub-frame mounting combination structure of a vehicle body according to various exemplary embodiments of the present invention and FIG. 11 is a view showing a load transmission route in the sub-frame mounting combination structure of a vehicle body according to various exemplary embodiments of the present invention.

As shown in FIG. 10, a load in the X-direction, that is, in the longitudinal direction of the vehicle body may be reduced by the 'H'-shaped combination structure of the cap type bracket 5 and the fender apron side member 1, and a cap type reinforcement member 7 disposed inside the cap type bracket 5.

Furthermore, a load in the Y-direction, that is, in the transverse direction of the vehicle body may be reduced by the 'L'-shaped combination structure of the cap type bracket 5 and the fender apron side member 1, and the cap type reinforcement member 7 disposed inside the cap type bracket 5.

Meanwhile, as shown in FIG. 11, the load transmitted from the lower portion of the vehicle body goes to the upper portion of the vehicle body through the first side extension 2 and the tunnel member 4 and is distributed to the interior of the vehicle through the fender apron side member 1 and the dash lower member 6.

Furthermore, the load transmitted from the lower portion of the vehicle body approaches the upper portion of the vehicle body through the second side extension 3 and is distributed to the interior of the vehicle through the fender apron side member 1 and the dash lower member 6.

As described above, according to various exemplary embodiments of the present invention, a flat floor structure is implemented by applying a 'cap type' sub-frame mounting structure, being able to prevent deterioration of durability due to an increase of the height of the front sub-frame rear end mounting portion and an increase of a chassis input load, and being able to increase the strength of the vehicle body may be improved.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A sub-frame mounting combination structure of a vehicle body which is a transverse vehicle body structure mounted on front side members disposed at a first side and a second side of a front of the vehicle body in a longitudinal direction of the vehicle body, the sub-frame mounting combination structure comprising:
a fender apron side member mounted at a rear end portion of the front side members in the longitudinal direction of the vehicle body;
a first side extension disposed in a transverse direction of the vehicle body and connected to an inside of the fender apron side member;
a second side extension disposed in the transverse direction of the vehicle body and connected to an outside of the fender apron side member;
a tunnel member disposed in the transverse direction of the vehicle body, connecting the first side extensions at first and second sides thereof at a center portion of the vehicle body to each other, and having a same phase as the first side extension; and
a bracket disposed to cover the fender apron side member at a portion where the fender apron side member and the first and second side extensions are connected.

2. The sub-frame mounting combination structure of claim 1, further including:
a dash lower side member disposed at and overlapping an overlapping portion formed by the first and second side extensions and the tunnel member.

3. The sub-frame mounting combination structure of claim 2, wherein a rear flange of the dash lower side member, the first and second side extensions, and a front flange of the tunnel member are welded to overlap one another.

4. The sub-frame mounting combination structure of claim 3, wherein the tunnel member is connected to overlap a bottom portion of the fender apron side member, and the first side extension is connected to overlap a bottom portion of the tunnel member.

5. The sub-frame mounting combination structure of claim 3, wherein the dash lower side member is disposed on a floor panel of the vehicle body.

6. The sub-frame mounting combination structure of claim 5, wherein the first and second side extensions and the tunnel member are disposed under the floor panel of the vehicle body.

7. The sub-frame mounting combination structure of claim 1, wherein the bracket is welded to overlap a flange of the second side extension on an external surface of the fender apron side member.

8. The sub-frame mounting combination structure of claim 7, wherin a reinforcement member is connected across first and second internal surfaces of the bracket on the first and second internal surfaces of the bracket in the transverse direction of the vehicle body.

9. The sub-frame mounting combination structure of claim 1, wherein the bracket is welded to overlap a flange of the first side extension on an internal surface of the fender apron side member.

10. The sub-frame mounting combination structure of claim 1, wherein a reinforcement member is welded to an internal surface of the bracket.

11. The sub-frame mounting combination structure of claim 1, further including:
a side rear reinforcement member forming a cross-section by being connected to the second side extension and the fender apron side member.

12. The sub-frame mounting combination structure of claim 11,
wherein a first end portion of the side rear reinforcement member is connected to a bottom portion of the fender apron side member, and a second end portion of the side rear reinforcement member is connected to the second side extension, and wherein the second side extension is connected to the bottom portion of the fender apron side member.

13. The sub-frame mounting combination structure of claim 12, wherein a dash lower side member is connected to a top portion of the fender apron side member at a portion where the fender apron side member and the second side extension are connected.

* * * * *